United States Patent [19]
Lutz

[11] 3,739,579
[45] June 19, 1973

[54] HYDRAULIC BRAKE MECHANISM

[76] Inventor: Russell L. Lutz, R.D. No. 1, Mohnton, Pa. 19540

[22] Filed: July 26, 1971

[21] Appl. No.: 166,180

Related U.S. Application Data
[63] Continuation-in-part of Ser. No. 36,362, May 11, 1970, abandoned.

[52] U.S. Cl.............. 60/54.6 R, 74/512, 74/516, 74/518
[51] Int. Cl............................................. F15b 7/00
[58] Field of Search.................. 60/54.6 R; 74/512, 74/516, 517, 518

[56] References Cited
UNITED STATES PATENTS 3,514,163   5/1970   MacDuff ........................ 60/54.5 P
2,884,803   5/1959   Willis ................................. 74/518
3,146,597   9/1964   Knauss ............................ 60/54.6 R

*Primary Examiner*—Martin P. Schwadron
*Assistant Examiner*—A. M. Zupcic
*Attorney*—Andrew R. Klein, Raymond H. Synnestvedt, Wm. H. Elliott et al.

[57] ABSTRACT

A hydraulic system actuator including a lever and structure defining a fulcrum for the lever and a link attached to the lever for actuating a pressure cylinder. The fulcrum of the lever is shifted relative to the lever in response to changing pressure within the hydraulic system created by rotation of the lever. The movement of the fulcrum increases the mechanical advantage of the lever as it approaches the end of its travel. The actuator has particular adaptability to vehicular brake systems.

8 Claims, 5 Drawing Figures

INVENTOR
RUSSELL L. LUTZ
BY Synnestvedt & Lechner
ATTORNEYS

HYDRAULIC BRAKE MECHANISM

CROSS-REFERENCE TO RELATED APPLICATION

This application is a continuation-in-part of my co-pending application Ser. No. 36,362 filed May 11, 1970, now abandoned, entitled HYDRAULIC BRAKE MECHANISM.

BACKGROUND OF THE INVENTION

1. Field of the Invention

This invention relates to devices for actuating manually operated hydraulic systems, particularly automotive hydraulic brake systems, wherein the mechanical advantage of the force transmitter may be changed in response to the needs of the system, thereby retaining the required force input within attainable levels.

2. Description of the Prior Art

In connection with automotive hydraulic brakes, it has long been common to employ power assist devices such as vacuum boosters or pumps to augment the force applied to the brake pedal to attain sufficiently high hydraulic pressure within the brake system, yet maintain a low level of physical/mechanical input required from the operator. The latter feature is particularly desirable in view of the increasing number of female drivers who, by reason of their smaller physical stature and muscle structure, are unable to apply as great a force to the brake pedal as would the average male driver. The use of such boosters has been necessitated by the steadily increasing speeds at which today's automobiles are capable of traveling, thereby requiring larger brakes, and by the automobile industry's change-over to disc-type brakes which require higher pedal pressures than do the conventional drum brakes.

The use of such booster units introduces several undesirable concomitant results. First, such systems are costly, both to buy initially and to maintain during the life of the car. Secondly, few of the systems available incorporate any means of modulating the amount of force applied to the master cylinder, but rather function in a fully-on/fully-off manner, i.e., the brake pedal acting similarly to a switch to control the application of force to the braking system in a constant, uncontrolled amount via the booster. Therefore, the braking system cannot distinguish between light, moderate and heavy physical inputs to the brake pedal, a situation which leads to a loss of brake "feel" to the driver and thus to overbraking which materially increases the probability of skidding and resultant loss of control over the vehicle in many situations, particularly in bad weather driving on ice or snow. A third undesirable feature of the common vacuum units arises from the fact that such units employ the intake manifold of the automobile engine as a source of vacuum. In order for the engine to run smoothly, the integrity of the manifold vacuum must be maintained. Vacuum units introduce another potential source of vacuum leakage because of the additional connection involved and because the length of the peripheral edge of the diaphragm which must be sealed and which tends to leak, especially as the automobile advances in age.

While the solution to the problem of generating higher hydraulic pressures without a booster would appear to be simply solved by increasing the mechanical advantage of the brake pedal structure, such a solution is not feasible because of the limited space requirements under the dashboard of modern automobiles; because it is psychologically undesirable from the standpoint of the driver to have a brake pedal throw which is unduly long; and because several state motor vehicle codes specify maximum acceptable lengths of pedal travel. Another solution would be to use a master cylinder having a larger bore. This, too, is undesirable as it decreases the overall mechanical advantage of the system and requires higher pedal pressures, which pedal pressures are not within the capabilities of all drivers — for example, many women. Thus, the automotive industry has found it necessary to employ boosters, generally of the vacuum type, to circumvent these problems, and has by doing so spawned a plethora of accompanying problems.

SUMMARY OF THE INVENTION

It is an object of this invention to provide an actuator for a hydraulic pressure system.

It is a further object of this invention to provide an actuating lever for a hydraulic pressure system, the mechanical advantage developed by the lever being responsive to the fluid pressure within the system.

It is another object of this invention to provide a brake system actuator which yields sufficiently high mechanical advantages to actuate the brakes without loss of pedal feel and without undue pedal travel, and to achieve these results economically and without recourse to powered assisting mechanisms.

It is an additional object of this invention to provide a brake pedal assembly which can easily replace conventional pedal assemblies of automobiles already manufactured.

Briefly, the foregoing objects are achieved by providing an assembly which incorporates a lever and structure for shifting the fulcrum of the lever to thereby increase its mechanical advantage in response to increased pressure requirements of the hydraulic system.

BRIEF DESCRIPTION OF THE DRAWINGS

The invention will be better understood in connection with the accompanying drawings in which.

DETAILED DESCRIPTION OF THE DRAWINGS

Figure 1:
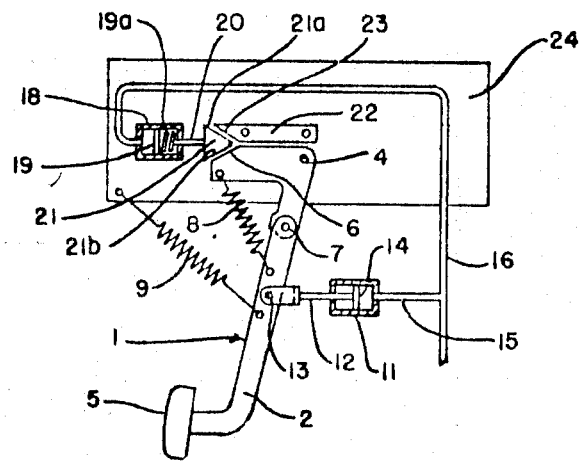
FIG. 1 is an illustration of the various components of the preferred mechanical embodiment of this invention.

With reference to FIGS. 1, 3, 4 and 5, there is shown a compound lever structure 1 which is utilized, for example, as a conventional automotive brake pedal lever. The lever 1 includes a primary section 2 to which the brake pedal pad 5 may be attached and an additional secondary member sudh as L-shaped member 3. Secondary member 3 is pivotally mounted within the vehicle, as in conventional automotive practice, by means of pivot structure 4. Member 3 also includes a generally horizontal arm 10 having a bearing surface such as surface 6. Primary member 2 is mounted for rotation in the same plane as member 3 and upon member 3 by a pivot structure 7, such as a conventional pivot pin. A simple stop structure is provided on member 3 to limit rotation in a clockwise direction of member 2 with respect to member 3. A tension spring 8 is mounted as shown with one end thereof attached to member 2 and the other end thereof attached to member 3. The spring constant of spring 8 is chosen so that upon initial application of force to lever 1, members 2 and 3 will pivot as a unit upon pivot structure 4, the spring 8 preventing rotation of member 2 with respect to member 3. The spring constant is also so chosen that upon increased pressure on the brake pedal, as is necessary to apply the brakes, when the rotation of lever 1 is continued to the point that the brake shoes are in contact with the drums, the spring 8 will yield, as will hereinafter be more fully explained.

Spring 9 is a pedal return spring and is attached at one end to member 2 and at the other end to support structure 24 contained within the vehicle. Spring 9 acts to return the lever to its normal position upon the removal of force from the lever.

Member 11 is a pressure cylinder used to generate pressure within the hydraulic system and could be, for example, a conventional brake master cylinder. Cylinder 11 is fixedly mounted on a supporting structure. A rigid connecting link 12 is attached at one end as, for example, by a conventional pivot pin 13, to the primary member 2. The other end of link 12 is operatively associated with piston 14 of cylinder 11. When a force is applied to the member 2, link 12 moves to cause piston 14 to be urged into the cylinder 11, thereby generating pressure within the fluid system.

Conduit 15 is in fluid-tight communication with cylinder 11 and conduits 16 and 17. Conduit 16 transmits fluid to the remaining components of the hydraulic system — for example, the wheel cylinders in an automobile braking system.

Conduit 17 transmits fluid from the cylinder 11 to a fluid motor such as the slave cylinder 18. Slave cylinder 18 includes a piston 19 and a piston return spring 19a. Fixed at one end to piston 19 is a connecting rod 20. Disposed on the other end of connecting rod 20 is a wedge 21 having bearing surfaces 21a and 21b thereon. Wedge 21 is preferably made of a material such as nylon or brass or a similar material to thereby eliminate the need for lubrication of this part and also to lessen the probability that this part will generate annoying rattling sounds. Fixedly mounted on a supporting structure 24 is a wedge block 22. Wedge block 22 is disposed with a bearing surface 23 for cooperation with bearing surface 6 of member 3.

Figure 3:
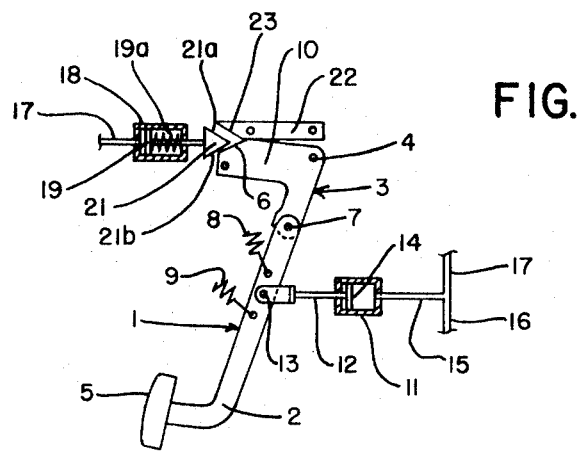
FIG. 3 is a view similar to FIG. 1 disclosing diagrammatically various components of the preferred embodiment in a rest position.
Figure 4:
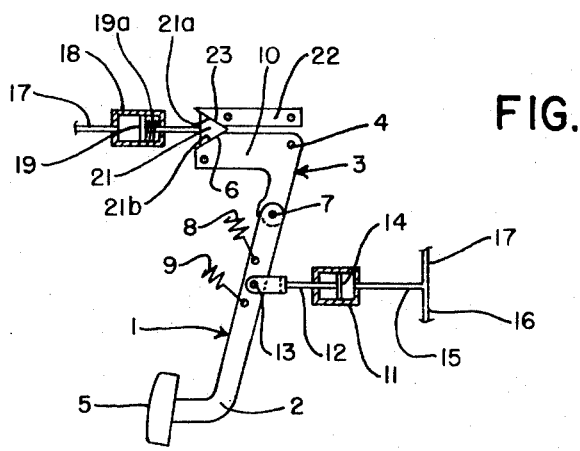
FIG. 4 is a view similar to FIG. 3 disclosing the various components in an intermediate position during the braking action.
Figure 5:
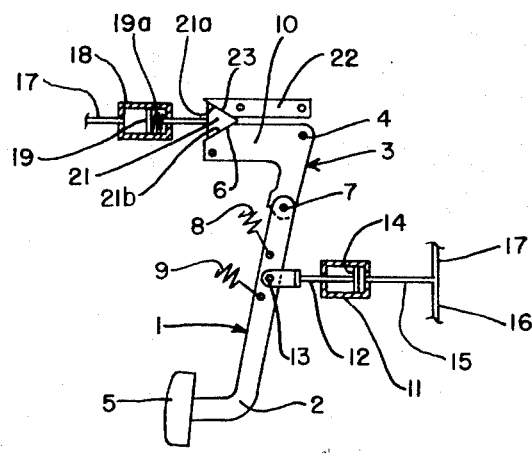
FIG. 5 is a view similar to FIGS. 3 and 4 showing the several components when the brake is in a fully "on" position.

Referring now particularly to FIGS. 3, 4 and 5, the several components of the preferred embodiment of this invention are shown in a rest or "off" position in FIG. 3, in an intermediate position in which the brake shoes have been brought into contact with the brake drum in FIG. 4, and in a position in which the brakes are in a full "on" position in FIG. 5. As shown in FIG. 3, in the "off" position of the brake, the arm 10 of member 3 is in a slightly upwardly tilted position and wedge 21 is partly withdrawn from between the bearing surfaces 6 and 23 as piston 19 is under the control of return spring 19a. In operation, force is applied to lever 1 and the entire lever structure begins pivoting about pivotal mounting 4. At this stage, as in ordinary automobile braking systems, little mechanical advantage is needed from the pedal since only force required is that needed to displace fluid from the cylinder 11 to the brake wheel cylinders via conduit 16 to thereby move the shoes into contact with the brake drums against the relatively small resistance of the brake shoe return springs. Concurrently, pressure in the system is likewise transmitted via conduit 17 to slave cylinder 18, thereby urging piston 19 and its associated connecting rod 20 outwardly. As a result of the pivoting of the lever structure around pivotal mounting 4 and the outward movement of piston rod 20, arm 10 of member 3 is rotated to a substantially horizontal position and wedge 21 is introduced into the space between the bearing surface 6 of member 3 and the bearing surface 23 of the wedge block, as illustrated in FIG. 4. Upon further brake-applying movement of the brake pedal at the start of the actual braking operation and with the brake shoes in contact with the brake drums, the required force of the pedal to cause continued movement of piston 14 is sufficient to overcome the tension of spring 8 whereby member 2 of the lever arm tends to rotate on pivot pin 13 with consequent clockwise rotation, as opposed to its previous counterclockwise rotation, of member 3 on pivot structure 4. However, as the pressure in the system has continued to be transmitted via conduit 17 to slave cylinder 18, the wedge 21 has been inserted into the space between the bearing surface 23 of the wedge block and the bearing surface 6 of member 3 to a position in which it is in overlying relationship and at least substantially in contact with surface 6 of member 3 as also illustrated in FIG. 4. As a result, such clockwise rotation of member 3 to any material extent will be precluded and the fulcrum point of the lever 1 will be shifted from the axis of pivot structure 4 to the axis of pivot structure 7. It will be noted that at the moment of this transition, the mechanical advantage of the lever 1 will be increased since the ratio of the distance of the point of application of force, namely the pedal pad 5 at the lower end of primary member 2, from the pivot point 7, to the distance between attachment point 13 of connecting link 12 from the pivot point 7, will be increased. Upon continued pressure on the brake pedal to exert full braking action, the several elements of the system will assume the positions illustrated in FIG. 5.

Thus, it can be seen that in the initial stages of braking, the mechanical advantage of lever 1 will be lower, but because of this, the necessary displacement of fluid from the cylinder 11 to move the brake shoes into engagement with the brake drum will be accomplished by moving the brake pedal 5 through a short arc. The system at this time displays the psychologically advantageous characteristic of having a short pedal throw. By the time the brake shoes are forced into engagement with the brake drum, when higher fluid pressures are required, the actuator shifts to a second phase in which the mechanical advantage of the lever is increased, thereby maintaining the required pedal force within an acceptable limit. The increase in the mechanical advantage which accompanies the shifting of the fulcrum point at the second phase of operation would, of course, necessarily require greater proportional movement of the brake pedal pad to obtain the same amount of displacement of piston 14. However, it must be realized that at the second phase of operation, the brake shoes are already at the practical limit of their travel, i.e., in contact with the drums, and therefore little further displacement of fluid from cylinder 11 is necessary. It is only necessary to generate higher pressure within the hydraulic system to force the shoes into frictional engagement with the drums. The drawback of employing the high mechanical advantage lever, namely increased pedal travel, is of no consequence in this stage of operation.

The system described above has the added advantage of being self-compensating or adjusting for wear. As the distance between the friction material of the brake shoes and the drum increases, the amount of fluid which must be displaced from cylinder 11 likewise increases. This increased displacement of fluid serves merely to urge piston 19 and connecting rod 20 out for a somewhat greater distance. This causes wedge 21 to be introduced further into the space between the bearing surfaces 6 and 23 of members 3 and 22 respectively. Thus, when the pedal has been depressed to the point where the brake bands are against the drum and any further movement of the pedal requires the application of such force that the tension of spring 8 is overcome, wedge 21 remains in a position in which it is in overlying contact with arm 10 of member 3, notwithstanding the fact that member 3 has been rotated in a counterclockwise direction through a substantially greater arc of travel during the initial but longer movement of the brake pedal in bringing the brake shoes into contact with their associated drums.

An additional safety feature which is not shown but which can easily be incorporated into the lever 1 is a limit or stop which would serve to preclude further rotation of primary member 2 about pivot pin 7. If for some reason the pedal fails to operate properly, after a certain amount of rotation of member 2 about pivot pin 7, the stop would again cause the lever 1 to rotate about pivot 4. Although the mechanical advantage of the shorter lever arm would be lost, the vehicle could still be brought safely to a stop by the application of normally humanly attainable force applied via the longer lever arm.

The description above relates to a preferred embodiment. The inventive concept is equally capable of being embodied in other structurally different forms. For instance, it could be embodied in the form illustrated in FIG. 2.

Figure 2:
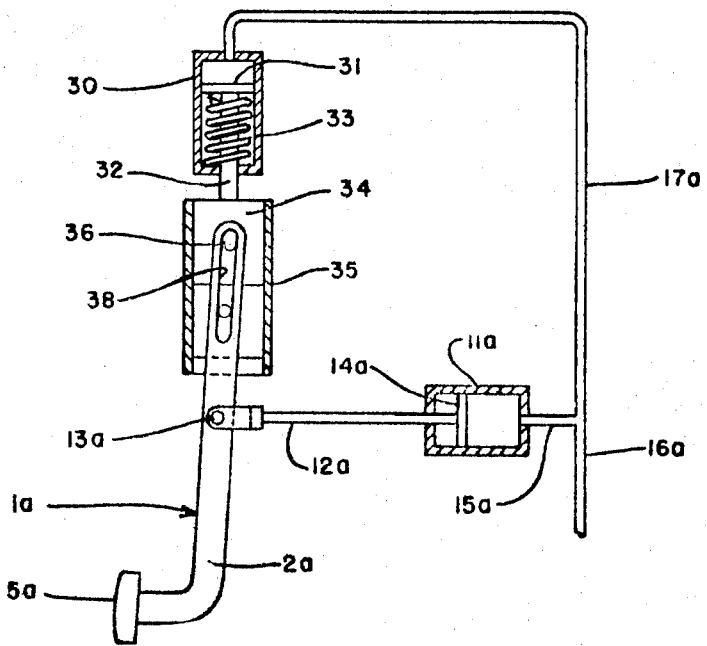
FIG. 2 is a schematic representation of a second system incorporating the inventive concept of this invention.

The system shown in FIG. 2 incorporates several elements common with the system of FIG. 1. Such elements will be identified by use of the same numeral and the addition of the suffix "a." The lever structure 1a shown in FIG. 2 includes the primary member 2a having a brake pedal pad 5a mounted at a lower end thereof. Pressure cylinder 11a is actuated by connecting link 12a fixed to member 2a as by a pivot pin 13a. Connecting link 12a is in a conventional manner associated with piston 14a whereby displacement of link 12a will effect movement of piston 14a. The fluid displaced from cylinder 11a by piston 14a is conducted by means of fluid-tight conduit 15a through branches 16a and 17a of the hydraulic circuit. Conduit 16a is, as in the FIG. 1 embodiment, used to transmit fluid to the remainder of the hydraulic system. Conduit 17a transmits fluid to a fluid motor such as slave cylinder 30 which contains piston 31 and its associated connecting rod 32 together with piston return spring 33. Disposed on the end of connecting rod 32 opposite the piston 31 is a sliding block 34 mounted in guide 35. Block 34 includes pivot structure such as pivot 36 which is slidably received in the elongated slot 38 disposed in the upper portion of primary member 2a.

In operation, the application of force to brake pedal pad 5a causes movement of link 12a and piston 14a. Fluid displaced from cylinder 11a is transmitted via conduit 16a through the remainder of the hydraulic system and via conduit 17a to the slave cylinder 30. Fluid introduced into cylinder 30 displaces piston 31, causing downward movement of block 34, thereby causing a shifting of the fulcrum point defined by pivot structure 36 of the lever 1. Thus, in the initial stages of movement, the mechanical advantage of the lever 1a is low and pedal travel is short. When the system reaches the point where the brake shoes would be positioned against the drum, the block 34 will have been moved downwardly and the mechanical advantage of the lever 1a will have been increased. As was noted above, this increase in mechanical advantage serves to maintain required applied force levels within an acceptable limit while maintaining the feel of the brake by not requiring an unduly long pedal throw.

It can be seen then that applicant has provided a brake actuating system which enjoys the advantages of assited braking systems yet does not require the expensive and troublesome vacuum booster unit. Additionally, the disclosed system retains the feel of the conventional non-assisted system which is frequently lost when employing the common vacuum booster unit. Thus, a driver of a vehicle using the disclosed system is less likely to overapply his brakes and thereby skid on slippery surfaces. Additionally, the disclosed system is more economical to install since the cost of such items as the slave cylinder, the tubing, and the remaining extra parts is well below that of a typical vacuum unit, thereby enhancing the marketability of the device both in the original equipment market and in the "after" market. Further, applicant's system obviates the need for any connection with the intake manifold of the vehicle's engine thus eliminating a possible source of engine roughness and poor performance by reason of leaking vacuum connections or sealing surfaces. Applicant's system does, however, retain the desired benefit of the vacuum assist systems by requiring only easily attainable muscular force inputs.

Although certain embodiments of the invention have been shown in the drawings and described in the specification, it is to be understood that the invention is not limited thereto, is capable of modification, and can be rearranged without departure from the spirit and scope of the invention.

I claim:

1. An actuating mechanism for a hydraulic system, which system includes a fluid pressurizing device comprising:

a lever arm;

fulcrum means for defining a fulcrum axis about which the lever arm is adapted to rotate;

means responsive to rotation of the lever arm for shifting the position of the fulcrum axis relative to the lever arm between first and second positions to change the mechanican advantage of the lever arm; and means mounted wherein the means for shifting the fulcrum axis includes a fluid motor on the lever arm for actuating the fluid pressurizing device in said first and second positions of said fulcrum axis 2. An actuating mechanism for a hydraulic system, which system includes a fluid pressurizing device comprising:
  a lever arm including:
    a first member, and
    a second member;
  fulcrum means for defining a fulcrum axis about which the lever arm is adapted to rotate including:
    first pivot means for pivotally mounting the first member, and
    second pivot means for pivotally mounting the second member to the first member; and
  means responsive to rotation of the lever arm for shifting the position of the fulcrum axis relative to the lever arm between said first and second pivot means to change the mechanical advantage of the lever arm, said means for shifting the fulcrum point including:
    means for precluding rotation in one direction of the first member about the first pivot means to enable rotation of the second member about the second pivot means, and
    means mounted on the lever arm for actuating the fluid pressurizing device.

3. A mechanism according to claim 2 wherein the lever arm includes yieldable means for preventing any substantial rotation of the second member about the second pivot means in at least one direction until rotation of the first member in said one direction is precluded.

4. A mechanism according to claim 2 wherein the rotation precluding means comprises:
  a fluid motor having a reciprocal rod;
  a wedge disposed on the rod;
  a wedge block; and
  a surface on the wedge block and a surface on the first member adapted to cooperate with the wedge to preclude rotation of the first member in said one direction.

5. A fluid system comprising:
  means for pressurizing fluid;
  a lever arm;
  fulcrum means for defining a fulcrum axis about which the lever arm is adapted to rotate;
  means mounted on the lever arm for actuating the fluid pressurizing device upon rotation of said lever arm about said fulcrum axis; and
  means in part responsive to pressure within the system developed by the pressurizing means for shifting the position of the fulcrum axis relative to the lever arm during its rotation and the actuation of said fluid pressurizing device to change the mechanical advantage of the lever arm wherein the means for shifting the fulcrum includes a fluid motor.

6. The system according to claim 5 wherein:
  the lever arm includes:
    a first member, and
    a second member;
  the fulcrum includes:
    first pivot means for pivotally mounting the first member, and
    second pivot means for pivotally mounting the second member to the first member; and
  the means for shifting the fulcrum point includes:
    means for precluding rotation in one direction of the first member about the first pivot means to enable rotation of the second member about the second pivot means.

7. A system according to claim 6 wherein the lever arm additionally includes yieldable means for preventing rotation of the second member about the second pivot means in at least one direction until rotation of the first member is precluded.

8. A system according to claim 6 wherein the rotation precluding means comprises:
  a fluid motor having a reciprocal rod;
  a wedge disposed on the rod;
  a wedge block; and
  a surface on the wedge block and a surface on the first member adapted to cooperate with the wedge to preclude rotation of the first member in said one direction.

* * * * *

UNITED STATES PATENT OFFICE
CERTIFICATE OF CORRECTION

Patent No. 3,739,579          Dated June 19, 1973

Inventor(s) Russell L. Lutz

It is certified that error appears in the above-identified patent and that said Letters Patent are hereby corrected as shown below:

Column 6, line 53: Cancel beginning with "1. An actuating mechanism" to and including "said fulcrum axis" in column 6, line 67, and insert the following claim:

1. An actuating mechanism for a hydraulic system, which system includes a fluid pressurizing device comprising:
        a lever arm;
        fulcrum means for defining a fulcrum axis about which the lever arm is adapted to rotate;
        means responsive to rotation of the lever arm for shifting the position of the fulcrum axis relative to the lever arm between first and second positions to change the mechanical advantage of the lever arm; and
        means mounted on the lever arm for actuating the fluid pressurizing device in said first and second positions of said fulcrum axis;
        wherein the means for shifting the fulcrum axis includes a fluid motor.

Signed and sealed this 27th day of November 1973.

(SEAL)
Attest:

EDWARD M. FLETCHER, JR.          RENE D. TEGTMEYER
Attesting Officer                Acting Commissioner of Patents